United States Patent
Katayama et al.

(10) Patent No.: US 10,935,232 B2
(45) Date of Patent: Mar. 2, 2021

(54) VIBRATION DAMPING STRUCTURE FOR HEAT-TRANSFER TUBE BUNDLE

(71) Applicant: MITSUBISHI HEAVY INDUSTRIES, LTD., Tokyo (JP)

(72) Inventors: Masaaki Katayama, Tokyo (JP); Masatsugu Monde, Tokyo (JP); Kazuo Hirota, Tokyo (JP); Naoki Ono, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 96 days.

(21) Appl. No.: 16/309,616

(22) PCT Filed: Jul. 21, 2017

(86) PCT No.: PCT/JP2017/026447
§ 371 (c)(1),
(2) Date: Dec. 13, 2018

(87) PCT Pub. No.: WO2018/092355
PCT Pub. Date: May 24, 2018

(65) Prior Publication Data
US 2019/0309940 A1 Oct. 10, 2019

(30) Foreign Application Priority Data
Nov. 21, 2016 (JP) .............................. JP2016-225636

(51) Int. Cl.
*F22B 37/20* (2006.01)
*F16F 3/02* (2006.01)
(Continued)

(52) U.S. Cl.
CPC ............ *F22B 37/206* (2013.01); *F16F 3/023* (2013.01); *F16F 15/02* (2013.01); *F16F 15/073* (2013.01);
(Continued)

(58) Field of Classification Search
CPC .......... F22B 37/206; F22B 37/20; F28D 7/16; F28D 1/06; F28D 7/06; F16F 15/02; F28F 9/013; F28F 2265/30
See application file for complete search history.

(56) References Cited

U.S. PATENT DOCUMENTS 4,789,028 A * 12/1988 Gowda .................. F22B 37/206
 138/173
4,991,645 A 2/1991 Lagally et al.
(Continued)

FOREIGN PATENT DOCUMENTS

JP 61-039292 U 3/1986
JP 62-093586 U 6/1987
(Continued)

OTHER PUBLICATIONS

Office Action dated Mar. 3, 2020, issued in counterpart EP Application No. 17 871 630.4 (6 pages).
(Continued)

*Primary Examiner* — Elizabeth J Martin
(74) *Attorney, Agent, or Firm* — Westerman, Hattori, Daniels & Adrian, LLP

(57) ABSTRACT

A vibration damping structure for a heat-transfer tube bundle including columns arranged at an interval and each composed of a plurality of heat-transfer tubes curved in a common plane and arranged in parallel to each other. The vibration damping structure includes a first vibration damping member and a second vibration damping member disposed between the columns so as to intersect the array direction of the columns. The first vibration damping member and the second vibration damping member are disposed at different positions in an axial direction of each heat-transfer tube, and thicknesses of the first vibration damping member and the second vibration damping member in the (Continued)

array direction are larger than an average value of a clearance between the columns under operation.

10 Claims, 10 Drawing Sheets

(51) Int. Cl.
*F16F 15/073* (2006.01)
*F28D 7/06* (2006.01)
*F16F 15/02* (2006.01)
*G21D 1/00* (2006.01)
*F22B 1/02* (2006.01)

(52) U.S. Cl.
CPC ............... *F22B 1/025* (2013.01); *F28D 7/06* (2013.01); *G21D 1/00* (2013.01); *F16F 2224/0208* (2013.01); *F28F 2265/30* (2013.01); *Y02E 30/30* (2013.01)

(56) References Cited

U.S. PATENT DOCUMENTS

| 2014/0034269 A1* | 2/2014 | Shimizu | F28F 9/007 165/69 |
| 2016/0061441 A1 | 3/2016 | Matsubara et al. | |

FOREIGN PATENT DOCUMENTS

| JP | 2012-122649 A | 6/2012 |
| JP | 2014-035161 A | 2/2014 |
| WO | 2014/174692 A1 | 10/2014 |
| WO | 2015/04763 A1 | 4/2015 |

OTHER PUBLICATIONS

Extended Search Report dated Jul. 2, 2019, issued in counterpart EP Application No. 17871630.4 (8 pages).
Japan Institute of Invention and Innovation, Journal of Technical Disclosure No. 90-15881, Aug. 20, 1990, (2 pages). Cited in International Search Report dated Oct. 10, 2017.
International Search Report dated Oct. 10, 2017, issued in counterpart Application No. PCT/JP2017/026447 (11 pages).
Written Opinion dated Mar. 5, 2019, issued in counterpart Application No. PCT/JP2017/026447, with English Translation. (13 pages).
Office Action dated May 26, 2020, issued in counterpart JP application No. 2016-225636, with English translation. (10 pages).

* cited by examiner

VIBRATION DAMPING STRUCTURE FOR HEAT-TRANSFER TUBE BUNDLE

TECHNICAL FIELD

The present disclosure relates to a vibration damping structure for a heat-transfer tube bundle for suppressing vibration by a vibration damping member disposed in a clearance between tubes in the tube bundle disposed in a fluid.

BACKGROUND ART

Some tube bundles used in heat exchangers such as steam generators adopt a vibration vamping structure in which an anti-vibration bar is inserted as a vibration damping member into a clearance between tubes for suppressing vibration caused when the tube bundle is disposed in a fluid. For instance, Patent Document 1 discloses an example of the vibration damping structure for a heat-transfer tube bundle in which a substantially V-shaped vibration damping member is inserted into a clearance between heat-transfer tubes included in a heat exchanger.

CITATION LIST

Patent Literature

Patent Document 1: JPS62-93586A

SUMMARY

Problems to be Solved

It has been recently indicated that self-excited vibration phenomena, such as fluid elastic vibration, along an in-plane direction (an axial direction of individual tubes) can occur in a tube bundle having a U-bent portion including U-shaped tubes. A vibration damping member used in a conventional vibration damping structure including Patent Document 1 is assumed to be used for suppressing vibration which occurs in an out-of-plane direction (a direction substantially perpendicular to the axial direction of individual tubes), and thus the thickness thereof is designed to be equal to or slightly smaller than a clearance between tubes. Hence, a contact force applied to each tube by the vibration damping member is substantially zero, and measures are desired to suppress a vibration phenomenon in the in-plane direction.

To solve this problem, for instance, it is considered that a contact force is applied to each tube by adjusting the thickness of the vibration damping member disposed in the clearance between the tubes so as to suppress the vibration phenomenon in the in-plane direction. However, since members constituting the vibration damping structure have some manufacturing errors, it is difficult to set an appropriate contact force to suppress vibration taking into consideration the influence of these errors. Especially in this type of heat-transfer tube, when a gap is formed in the heat-transfer tube bundle due to some factors, the heat-transfer tube or the vibration damping member significantly vibrates with collision or sliding by a fluid force within the heat-transfer tube, which can cause wear. Such wear can further change a contact force set by the vibration damping member to the heat-transfer tube, resulting in a reduction in vibration damping performance.

At least one embodiment of the present invention was made in view of the above, and an object thereof is to provide a vibration damping structure for a heat-transfer tube bundle, whereby it is possible to effectively suppress a vibration phenomenon along the in-plane direction by appropriately setting a contact force applied from the vibration damping member to the heat-transfer tube.

Solution to the Problems (1) To solve the above problems, according to at least one embodiment of the present invention, a vibration damping structure for a heat-transfer tube bundle including columns each composed of a plurality of heat-transfer tubes curved in a common plane and arranged in parallel to each other the columns being arranged at an interval, comprises: at least one first vibration damping member disposed between a Nth column and a N+1th column so as to intersect an array direction of the columns, where N represents a natural number; and at least one second vibration damping member disposed between the N+1th column and a N+2th column so as to intersect the array direction, wherein the first vibration damping member and the second vibration damping member are disposed at different positions in an axial direction of each heat-transfer tube, and thicknesses of the first vibration damping member and the second vibration damping member in the array direction are larger than an average value of a clearance between the columns under operation.

With the above configuration (1), each of the heat-transfer tubes constituting the heat-transfer tube bundle is in contact with the first vibration damping member at one side of the column and is in contact with the second vibration damping member at the other side of the column so as to be supported from both sides. Since the first vibration damping member and the second vibration damping member are disposed at different positions in the axial direction of the heat-transfer tube, and their thicknesses are larger than an average value of the clearance during operation, each heat-transfer tube receives a contact force while being subjected to bending deformation by the vibration damping members. The contact force based on such bending deformation can be easily intentionally adjusted. Thus, it is possible to set an appropriate contact force for suppressing vibration.

The thicknesses of the first vibration damping member and the second vibration damping member may be set to be larger than the average value of the clearance during non-operation (typically, at normal temperature), or the thicknesses of the vibration damping members may be set to become larger than the average value of the clearance as a result of thermal expansion of the vibration damping members or pressure expansion of the heat-transfer tube during operation.

Moreover, even if a gap is locally generated within the heat-transfer tube bundle due to some factors, and the heat-transfer tube or the vibration damping member significantly vibrates with collision or sliding by a fluid force within the heat-transfer tube and causes wear, it is possible to decrease a significant reduction in contact force by elasticity of the vibration damping member and the heat-transfer tube subjected to bending deformation. Thus, the vibration damping performance is easily maintained even when wear occurs.

(2) In some embodiments, in the above configuration (1), each heat-transfer tube has an uneven cross-section in a plane intersecting the first vibration damping member or the second vibration damping member, and the first vibration damping member and the second vibration damping member abut on the heat-transfer tubes at a concave portion of the uneven cross-section.

With the above configuration (2), each heat-transfer tube constituting the heat-transfer tube bundle receives a contact force from the vibration damping member and thus has an uneven cross-section so that a concave portion abuts on the vibration damping member in a plane intersecting the vibration damping member.

(3) In some embodiments, in the above configuration (2) or (3), the first vibration damping member and the second vibration damping member are curved in an opposite direction to the plurality of heat-transfer tubes, and the first vibration damping member and the second vibration damping member are formed so as to increase curvature with an increase in distance from a curvature center of the plurality of heat-transfer tubes.

With the above configuration (3), since the vibration damping members are thus formed, it is possible to achieve excellent vibration damping performance over a wide range of the respective columns, using a limited number of the vibration damping members.

(4) In some embodiment, in any one of the above configurations (1) to (3), the first vibration damping member and the second vibration damping member are each composed of a plate member having a uniform thickness in the array direction.

The above configuration (4) provides effective vibration damping performance by using the vibration damping members composed of a plate member having a uniform thickness. Such vibration damping members have a simple structure and thus can be easily manufactured and is advantageous in cost.

(5) In some embodiments, in any one of the above configurations (1) to (4), the vibration damping structure further comprises a third vibration damping member disposed between the Nth column and the N+1th column so as to face the second vibration damping member across the heat-transfer tubes.

With the above configuration (5), the third vibration damping member disposed to face the second vibration damping member across the heat-transfer tubes provides a contact force against the contact force based on bending deformation by the second vibration damping member. Thus, the contact forces are applied to the heat-transfer tube from both sides, and more stability is ensured.

In addition, a case where the third vibration damping member is disposed between the N+1th column and the N+2th column so as to face the first vibration damping member across the heat-transfer tubes 5 is substantially equivalent to (5), so that the same effects can be achieved.

(6) In some embodiments, in the above configuration (5), the third vibration damping member is thinner in the array direction than the first vibration damping member.

With the above configuration (6), the third vibration damping member is thinner than the other vibration damping members, and it elastically supports the heat-transfer tube from the opposite side against the contact force based on bending deformation by the first and second vibration damping members. Thereby, it is possible to provide excellent vibration damping performance. Also, the third vibration damping member can be put in the clearance between the heat-transfer tubes bent by the first and second vibration damping members and thus is suitable in terms of layout.

(7) To solve the above problem, according to at least one embodiment of the present invention, a vibration damping structure for a heat-transfer tube bundle including columns each composed of a plurality of heat-transfer tubes curved in a common plane and arranged in parallel to each other, the columns being arranged at an interval, comprises: at least one first vibration damping member disposed between a Nth column and a N+1th column so as to intersect an array direction of the columns, where N represents a natural number; and at least one second vibration damping member disposed between the N+1th column and a N+2th column so as to intersect the array direction, wherein the first vibration damping member and the second vibration damping member are disposed at an identical position in an axial direction of each heat-transfer tube so as to face each other across the heat-transfer tubes, and the first vibration damping member and the second vibration damping member have different thicknesses in the array direction.

With the above configuration (7), each of the heat-transfer tubes constituting the heat-transfer tube bundle is in contact with the first vibration damping member at one side of the column and is in contact with the second vibration damping member at the other side of the column so as to be supported from both sides. Since the first vibration damping member and the second vibration damping member are disposed at the same position in the axial direction of the heat-transfer tube, and their thicknesses are different from each other, each heat-transfer tube receives a contact force while being subjected to bending deformation by the vibration damping members. The contact force based on such bending deformation can be easily intentionally adjusted. Thus, it is possible to set an appropriate contact force for suppressing vibration.

Moreover, even if a significant gap is locally generated within the heat-transfer tube bundle due to some factors, and the heat-transfer tube or the vibration damping member significantly vibrates with collision or sliding by a fluid force within the heat-transfer tube and causes wear, it is possible to decrease a significant reduction in contact force by elasticity of the vibration damping member and the heat-transfer tube subjected to bending deformation. Thus, the vibration damping performance is easily maintained even when wear occurs.

(8) In some embodiments, in the above configuration (7), each heat-transfer tube has an uneven cross-section in a plane intersecting the first vibration damping member or the second vibration damping member, and the first vibration damping member and the second vibration damping member abut on the heat-transfer tubes at a concave portion of the uneven cross-section.

With the above configuration (8), each heat-transfer tube constituting the heat-transfer tube bundle receives a contact force from the vibration damping member and thus has an uneven cross-section so that a concave portion abuts on the vibration damping member in a plane intersecting the vibration damping member.

(9) In some embodiments, in the above configuration (7) or (8), the at least one first vibration damping member includes a first thick vibration damping member and a first thin vibration damping member thinner than the first thick vibration damping member, the first thick vibration damping member and the first thin vibration damping member being alternately arranged along the common plane, and the at least one second vibration damping member includes a second thin vibration damping member disposed to face the first thick vibration damping member across the heat-transfer tubes and a second thick vibration damping member disposed to face the first thin vibration damping member across the heat-transfer tubes.

With the above configuration (9), since the first and second vibration damping members arranged along the common plane have alternate thickness, each heat-transfer tube is efficiently subjected to bending deformation by the first and second vibration damping members and achieves good contact force.

(10) In some embodiments, in the above configuration (7) or (8), each of the at least one first vibration damping member includes a first thick portion disposed in a first region and a first thin portion disposed in a second region adjacent to the first region along an axial direction of each heat-transfer tube, the first thin portion being thinner than the first thick portion, and each of the at least one second vibration damping member includes a second thin portion disposed to face the first thick portion across the heat-transfer tubes and a second thick portion disposed to face the first thin portion across the heat-transfer tubes.

With the above configuration (10), since the first and second vibration damping members arranged along the common plane have alternate thickness, each heat-transfer tube is efficiently subjected to bending deformation by the first and second vibration damping members and achieves good contact force.

(11) In some embodiments, in any one of the above configurations (7) to (10), the first vibration damping member and the second vibration damping member are curved in an opposite direction to the plurality of heat-transfer tubes, and the first vibration damping member and the second vibration damping member are formed so as to increase curvature with an increase in distance from a curvature center of the plurality of heat-transfer tubes.

In the above configuration (11), since the vibration damping members are thus formed, it is possible to achieve excellent vibration damping performance over a wide range of the respective columns, using a limited number of the vibration damping members.

Advantageous Effects

At least one embodiment of the present invention provides a vibration damping structure for a heat-transfer tube bundle, whereby it is possible to effectively suppress a vibration phenomenon along an in-plane direction by appropriately setting a contact force applied from a vibration damping member to a heat-transfer tube.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal". "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

First Embodiment

Figure 1:
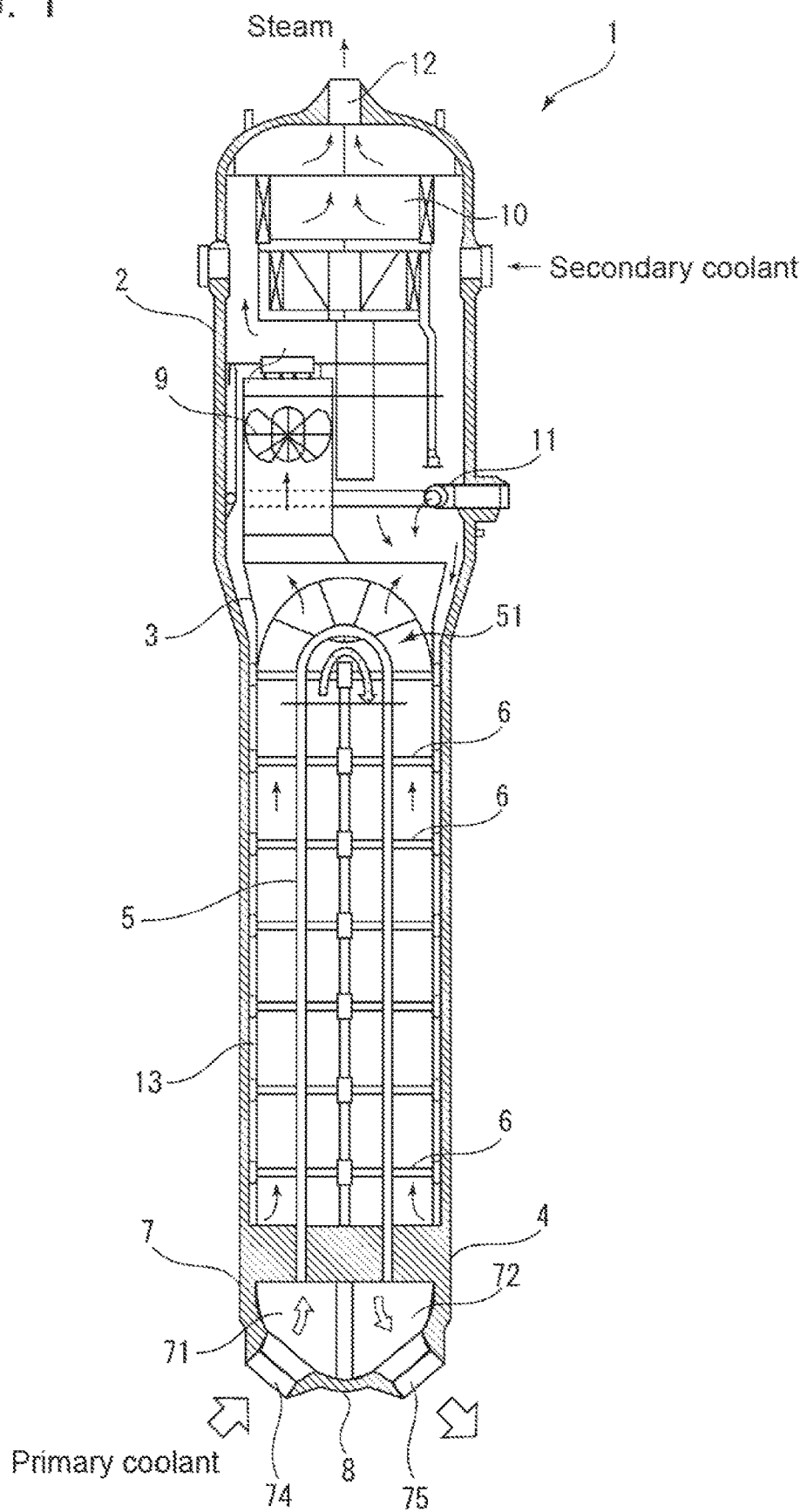
FIG. 1 is a schematic side cross-sectional view of a steam generator adopting a vibration damping structure for a heat-transfer tube bundle according to a first embodiment.

First, an overall configuration of a steam generator 1 adopting a vibration damping structure for a heat-transfer tube bundle 51 according to a first embodiment will be described with reference to FIG. 1. FIG. 1 is a schematic side cross-sectional view of the steam generator 1 adopting the vibration damping structure for the heat-transfer tube bundle 51 according to the first embodiment.

The steam generator 1 is a heat exchanger having a heat-transfer tube bundle including a plurality of heat-transfer tubes, for instance, a steam generator used in a pressurized water reactor (PWR). Through the steam generator 1 flow a primary coolant (e.g., soft water), serving as a reactor coolant and a neutron moderator circulating within a reactor, and a secondary coolant circulating within a turbine. In the steam generator 1, the primary coolant with increased temperature and pressure transfers heat to the secondary coolant, so that the secondary coolant is evaporated into steam, and the primary coolant with increased temperature and pressure is cooled.

The steam generator 1 has a sealed hollow cylindrical shape disposed along a vertical direction. The steam generator 1 has a body section 2 including an upper half portion and a lower half portion having a slightly smaller diameter than the upper half portion. Within the lower half portion, a tube bundle wrapper 3 of cylindrical shape is disposed at a predetermined distance from an inner wall surface of the body section 2. The tube bundle wrapper 3 has a lower end which extends to near a tube sheet 4 disposed at a lower part of the lower half portion of the body section 2. Within the tube bundle wrapper 3, a heat-transfer tube bundle 51 is disposed. The heat-transfer tube bundle 51 includes a plurality of heat-transfer tubes 5 each having a reversed U-shape. Each heat-transfer tube 5 is arranged so that a U-shaped are portion is convex upward. Both lower end portions of the heat-transfer tube 5 are supported by the tube sheet 4, and a middle portion is supported by the tube bundle wrapper 3 via a plurality of tube support plates 6. The tube support plate 6 has multiple through holes (not shown) formed therein. The heat-transfer tubes 5 are inserted into the through holes.

A lower end of the body section 2 is provided with a channel head 7. The interior of the channel head 7 is divided into an inlet chamber 71 and an outlet chamber 72 by a partition plate 8. The inlet chamber 71 communicates with one end of each heat-transfer tube 5, and the outlet chamber 72 communicates with the other end of each heat-transfer tube 5. The inlet chamber 71 is provided with an inlet nozzle 74 communicating with the outside of the body section 2, and the outlet chamber 72 is provided with an outlet nozzle 75 communicating with the outside of the body section 2. The inlet nozzle 74 is connected to a cooling water pipe (not shown) through which the primary coolant is transferred from the pressurized water reactor, and the outlet nozzle 75 is connected to a coolant water pipe (not shown) thorough which the primary coolant after heat exchange is transferred to the pressurized water reactor.

The upper half portion of the body section 2 is provided with a moisture separator 9 for separating the secondary coolant after heat exchange into steam (gas phase) and hot water (liquid phase), and a steam dryer 10 for removing moisture of the separated steam into a state close to dry steam. A feedwater ring 11 for supplying the secondary coolant into the body section 2 from the outside is inserted between the moisture separator 9 and the heat-transfer tube bundle 51. An upper end of the body section 2 is provided with a steam outlet 12. Further, a feedwater channel 13 is disposed within the lower half portion of the body section 2, thorough which the secondary coolant supplied into the body section 2 from the feedwater ring 11 flows downward between the body section 2 and the tube bundle wrapper 3, turns at the tube sheet 4, and then flows upward along the heat-transfer tube bundle 51.

The steam outlet 12 is connected to a cooling water pipe (not shown) for transferring steam to the turbine. The feedwater ring 11 is connected to a cooling water pipe (not shown) for supplying the secondary coolant which is steam used in the turbine and then cooled by a condenser (not shown).

In such a steam generator 1, the primary coolant heated in the pressurized water reactor is transferred to the inlet chamber 71, passes and circulates through the multiple heat-transfer tubes 5, and reaches the outlet chamber 72. On the other hand, the secondary coolant cooled by the condenser is transferred to the feedwater ring 11, passes through the feedwater channel 13 within the body section 2, and flows upward along the heat-transfer tube bundle 51. At this time, heat exchange occurs between the primary coolant having high pressure and high temperature and the secondary coolant within the body section 2. Then, the cooled primary coolant returns to the pressurized water reactor through the outlet chamber 72. On the other hand, the secondary coolant after heat exchange with the primary coolant having high pressure and high temperature flows upward within the body section 2 and is separated into steam and hot water by the moisture separator 9. The moisture of the separated steam is removed by the steam dryer 10, and the steam is then transferred to the turbine.

Figure 2:
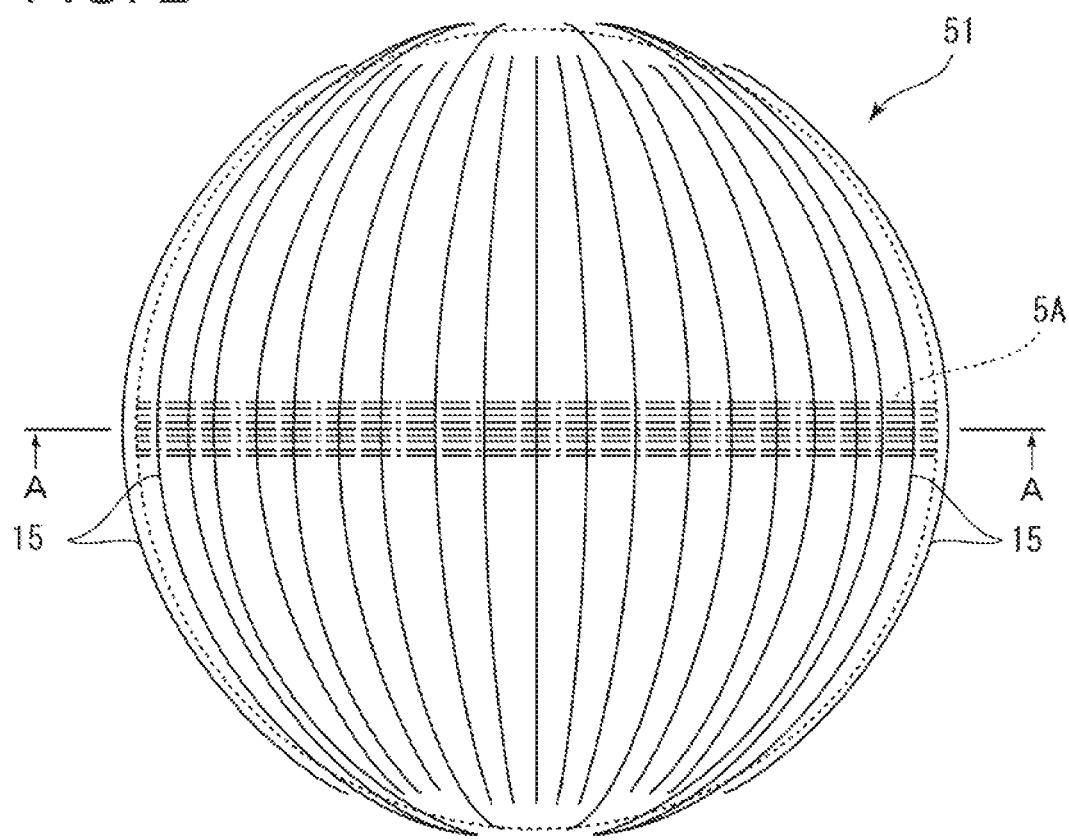
FIG. 2 is a schematic plan view of the heat-transfer tube bundle in FIG. 1.
Figure 3:
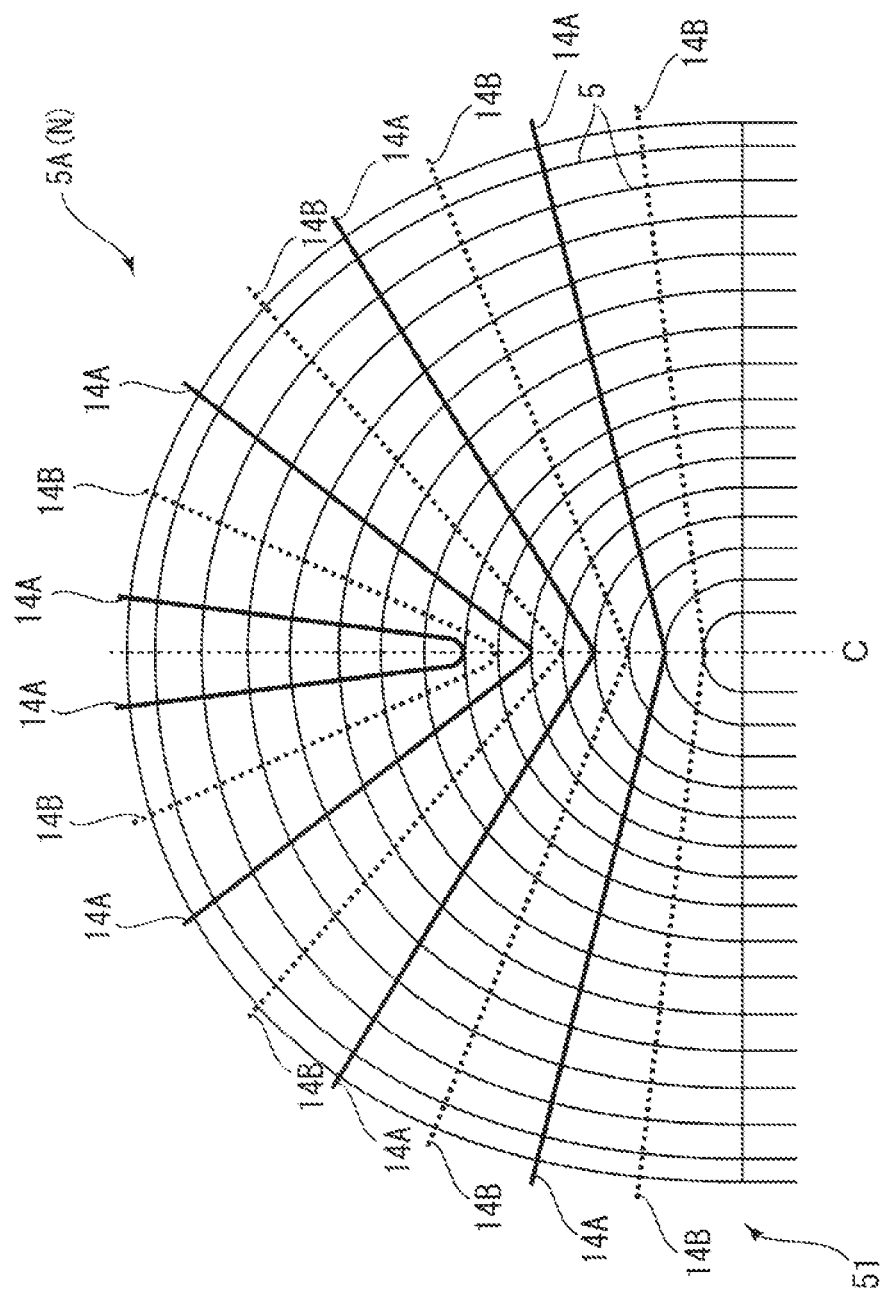
FIG. 3 is a cross-sectional view taken along line A-A in FIG. 2.
Figure 4:
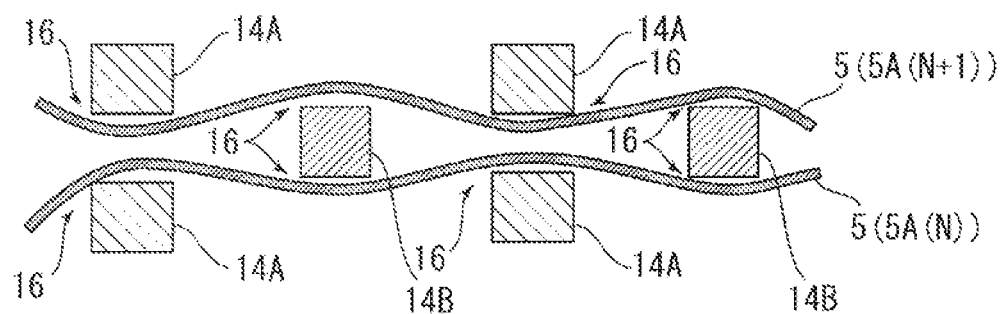
FIG. 4 is an enlarged plan view of the heat-transfer tube bundle in FIG. 2 viewed from above.

Next, the configuration of the heat-transfer tube bundle 51 of the above-described steam generator 1 will be described in detail. FIG. 2 is a schematic plan view of the heat-transfer tube bundle 51 in FIG. 1. FIG. 3 is a cross-sectional view taken along line A-A in FIG. 2. FIG. 4 is an enlarged plan view of the heat-transfer tube bundle 51 in FIG. 2 viewed from above.

An upper end portion of the heat-transfer tube bundle 51 has a semi-spherical shape in which are portions of the heat-transfer tubes 5 of reversed U-shape are arranged. As shown in FIG. 3, each heat-transfer tube 5 is bent with a predetermined curvature radius in a plane. Thus, the heat-transfer tube 5 is laterally symmetric across a central plane C which is an axial cross-section of the heat-transfer tube 5 passing through the apex in the middle of the are portion of the heat-transfer tube 5 and the center of the curvature radius. Further, the heat-transfer tubes 5 are arranged so that a heat-transfer tube 5 situated more outside in a radial direction of the curvature radius has a lager curvature radius and their axial directions are parallel, thereby forming respective columns (heat-transfer tube layers) 5A.

As shown in FIG. 2, the columns 5A are arranged in parallel at a predetermined interval in an out-of-plane direction perpendicular to their planes. In these columns 5A, among the respective heat-transfer tubes 5 situated outermost in the radial direction of the curvature radius in their plane, one situated more outside in the out-of-plane direction has a smaller curvature radius. The heat-transfer tubes 5 thus arranged form the upper end portion of the heat-transfer tube bundle 51 of semi-spherical shape.

The heat-transfer tube 5 having the are portion of reversed U-shape causes a problem of flow-induced vibration when the primary coolant passes therethrough. Hence, the steam generator 1 adopts the vibration damping structure by providing a plurality of vibration damping members 14 on the are portion of the heat-transfer tube 5 for suppressing vibration of the heat-transfer tube 5.

A plurality of vibration damping members 14 are inserted between the columns 5A. Each vibration damping member 14 may be for instance made of a metal material such as stainless steel. As shown in FIG. 3, the vibration damping member 14 is curved in an opposite direction to the heat-transfer tubes 5. In particular, the vibration damping member 14 is formed by bending a bar having a rectangular cross-section into a substantially V-shape. The vibration damping member 14 is arranged so that its bent portion is positioned on the central side (inner side) in the radial direction of the curvature radius of the heat-transfer tube 5 and its two end portions are positioned on the outer side in the radial direction. The both end portions of the vibration damping member 14 protrude outwardly from the outermost heat-transfer tube 5 in the radial direction of the curvature radius and are retained by a retention member 15.

Further, as shown in FIG. 3, a plurality of vibration damping members 14 are disposed in each column 5A so as to intersect an array direction in which the columns 5A are arranged. These vibration damping members 14 are arranged so as to increase the curvature with an increase in distance from the curvature center of the heat-transfer tubes 5 (In other words, they are arranged so that the substantially V-shape becomes smaller sequentially from the inner side to the outer side). When the vibration damping members 14 are thus arranged, it is possible to achieve excellent vibration damping performance over a wide range of the respective columns 5A, using a limited number of the vibration damping members 14.

In FIG. 3, among the plurality of vibration damping members 14, in particular, a first vibration damping member 14A disposed between a column 5A(N) and a column 5A(N+1) is represented by the solid line, and a second vibration damping member 14B disposed between the N+1th column 5A(N+1) and a N+2th column 5A(N+2) is transparently represented by the dotted line. The first vibration damping member 14A and the second vibration damping member 14B are disposed at different positions in the axial direction of the heat-transfer tube 5 (In other words, they are alternately arranged along the axial direction of the heat-transfer tube 5 in the adjacent columns 5A respectively). The thicknesses of the first vibration damping member 14A and the second vibration damping member 14B are set to be larger than an average value of a clearance between the respective columns 5A.

Thus, as shown in FIG. 4, each of the heat-transfer tubes 5 constituting the heat-transfer tube bundle 51 is in contact with the first vibration damping member 14A at one side and is in contact with the second vibration damping member 14B at the other side of the column so as to be supported from both sides. Further, as described above, since the first vibration damping member 14A and the second vibration damping member 14B are disposed at different positions in the axial direction of the heat-transfer tube 5, and their thicknesses are larger than an average value of the clearance, each heat-transfer tube 5 receives a contact force and is subjected to bending deformation (three-point bending) by these vibration damping members 14, as shown in FIG. 4.

The heat-transfer tube 5 subjected to bending deformation by the contact force has an uneven cross-section when viewed from above (in a plane intersecting the first vibration damping member 14A or the second vibration damping member 14B), as shown in FIG. 4. Further, the first vibration damping member 14A and the second vibration damping member 14B abut on the heat-transfer tube 5 at a concave portion 16 of the uneven cross-section. The contact force based on such bending deformation is easy to intentionally adjust the magnitude, compared with a contact force mainly based on friction between members conventionally used, thus effectively suppressing a vibration phenomenon along the in-plane direction, such as flow-induced vibration.

Moreover, even if local displacement occurs within the heat-transfer tube bundle 51 due to some factors, and the heat-transfer tube 5 or the vibration damping member 14 significantly vibrates with collision or sliding by a fluid force within the heat-transfer tube 5 and causes wear, it is possible to decrease a significant reduction in contact force by elasticity of the vibration damping member 14 and the heat-transfer tube 5 subjected to bending deformation. Thus, it is possible to avoid a state where vibration damping performance immediately disappears even when wear occurs.

Further, since such a vibration damping structure can be realized by a simple vibration damping member 14 composed of a plate member having a uniform thickness in the array direction of the columns 5A, it can be easily manufactured and is advantageous in terms of cost.

Figure 5:
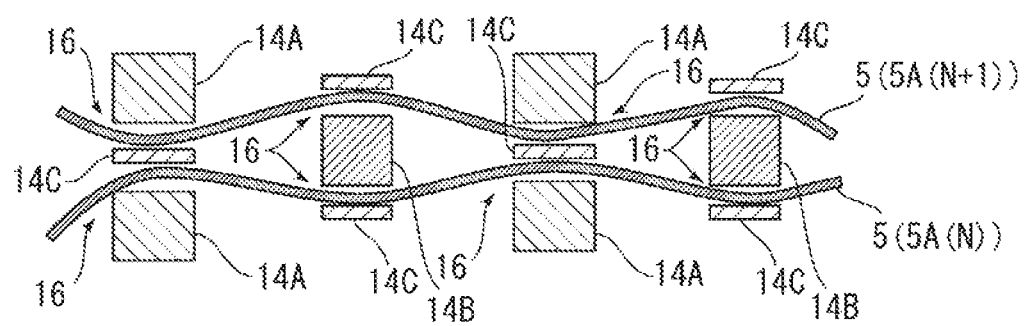
FIG. 5 is a plan view of a modified example of FIG. 4.

Next, a modified example of the first embodiment will be described. FIG. 5 is a plan view of a modified example of FIG. 4. This modified example further includes a third vibration damping member 14C disposed between the Nth column 5A(N) and the N+1th column 5A(N+1) so as to face the second vibration damping member 14B across the heat-transfer tube 5. The third vibration damping member 14C provides a contact force against the contact force based on bending deformation by the second vibration damping member 14B, thus improving stability.

In addition, the third vibration damping member 14C is also disposed so as to face the first vibration damping member 14A across the heat-transfer tube 5, so that the same effects can be achieved.

The third vibration damping member 14C is thin in the array direction of the columns 5A, compared with the vibration damping members 14A and 14B, and elastically supports the heat-transfer tube 5 from the opposite side against the contact force based on bending deformation by the vibration damping members 14A and 14B, thereby providing excellent vibration damping performance. Also, the third vibration damping member 14C can be compactly put in the clearance between the heat-transfer tubes 5 subjected to bending deformation by the vibration damping members 14A and 14B and thus is suitable in terms of layout.

Figure 6:
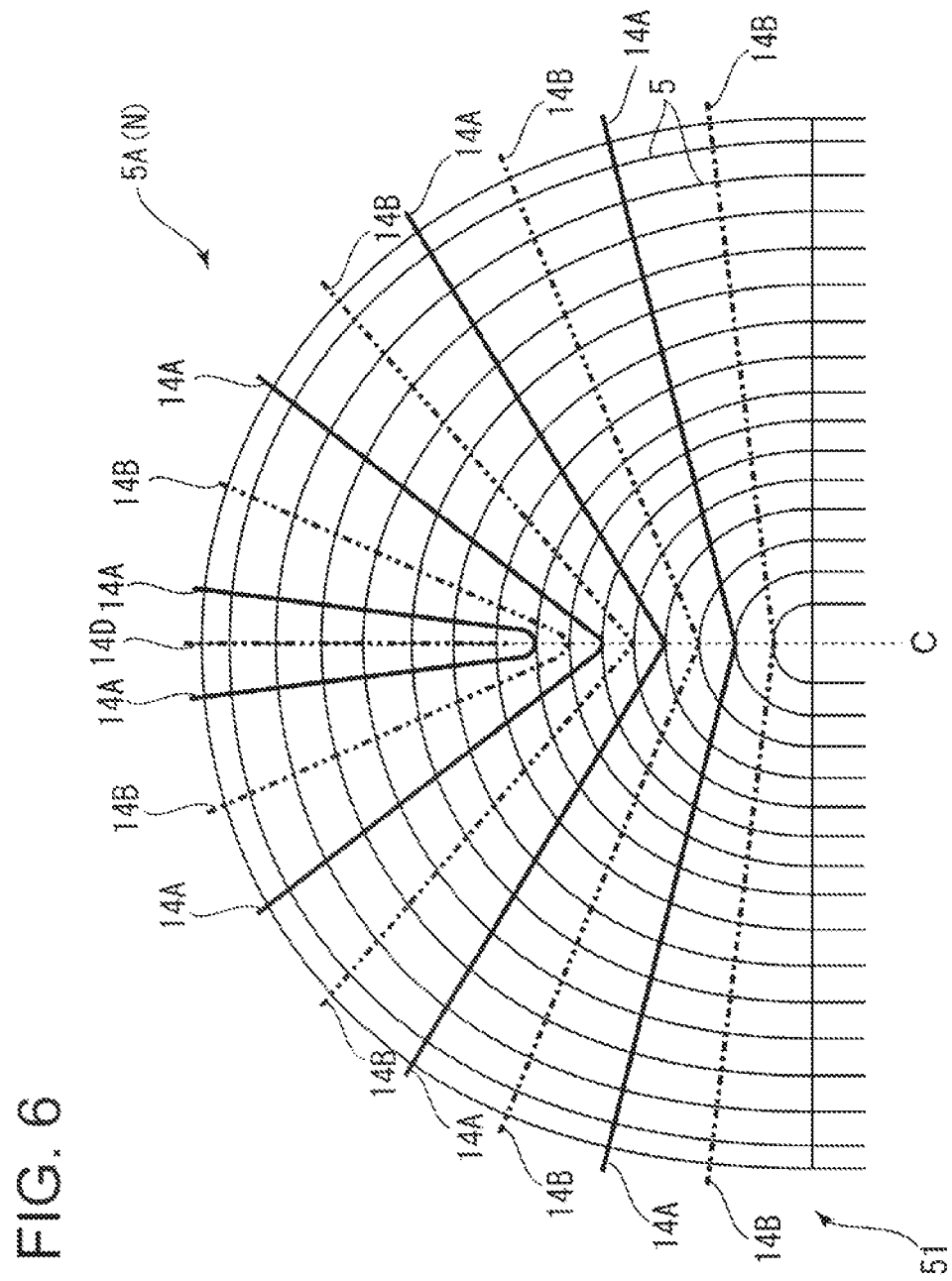
FIG. 6 is a plan view of another modified example of FIG. 4.

FIG. 6 is a plan view of another modified example of FIG. 4. This modified example further includes a forth vibration damping member 14D extending substantially parallel to the central plane C. In the example shown in FIG. 4, as described above, the heat-transfer tubes 5 are disposed so as to increase their curvature with an increase in distance from the curvature center of the heat-transfer tubes 5, and, at the outermost side, the first vibration damping member 14A is disposed on both sides of the central plane C. Accordingly, in this region, the first vibration damping member 14A and the second vibration damping member 14B do not alternate unlike the other regions, and a contact force based on bending deformation is not applied to the heat-transfer tube 5.

By contrast, in the example shown in FIG. 6, since the forth vibration damping member 14D is disposed on the opposite side, across the column, to the first vibration damping member 14A disposed on both sides of the central plane C, a contact force based on bending deformation is applied to the heat-transfer tube 5 also in this region. Thereby, in this modified example, it is possible to apply a contact force to the heat-transfer tube 5 even in a region near the central plane C, and it is possible to exhibit excellent vibration damping performance.

Second Embodiment

Figure 7:
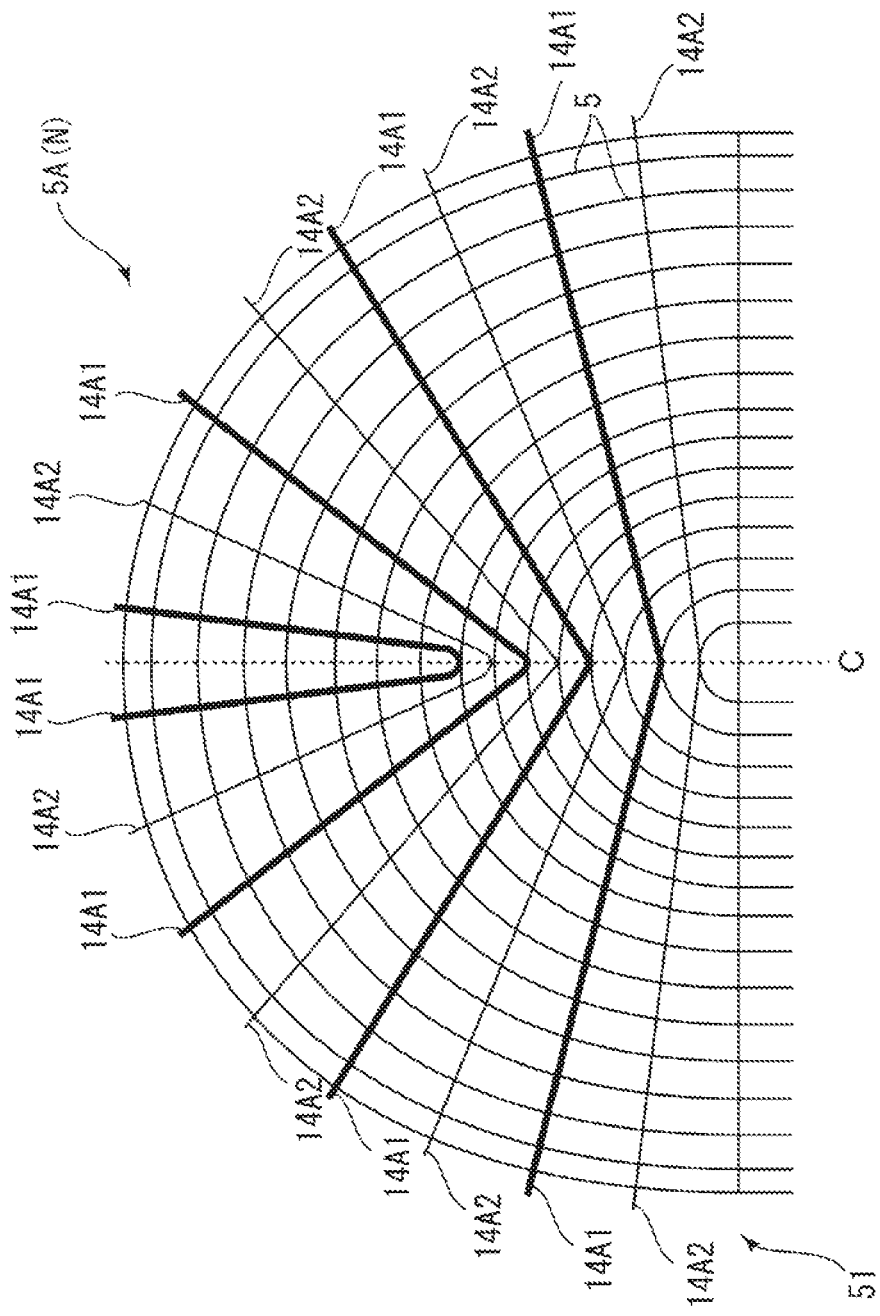
FIG. 7 is a diagram showing the layout of vibration damping members in a column 5A(N) of a heat-transfer tube bundle according to a second embodiment.
Figure 8:
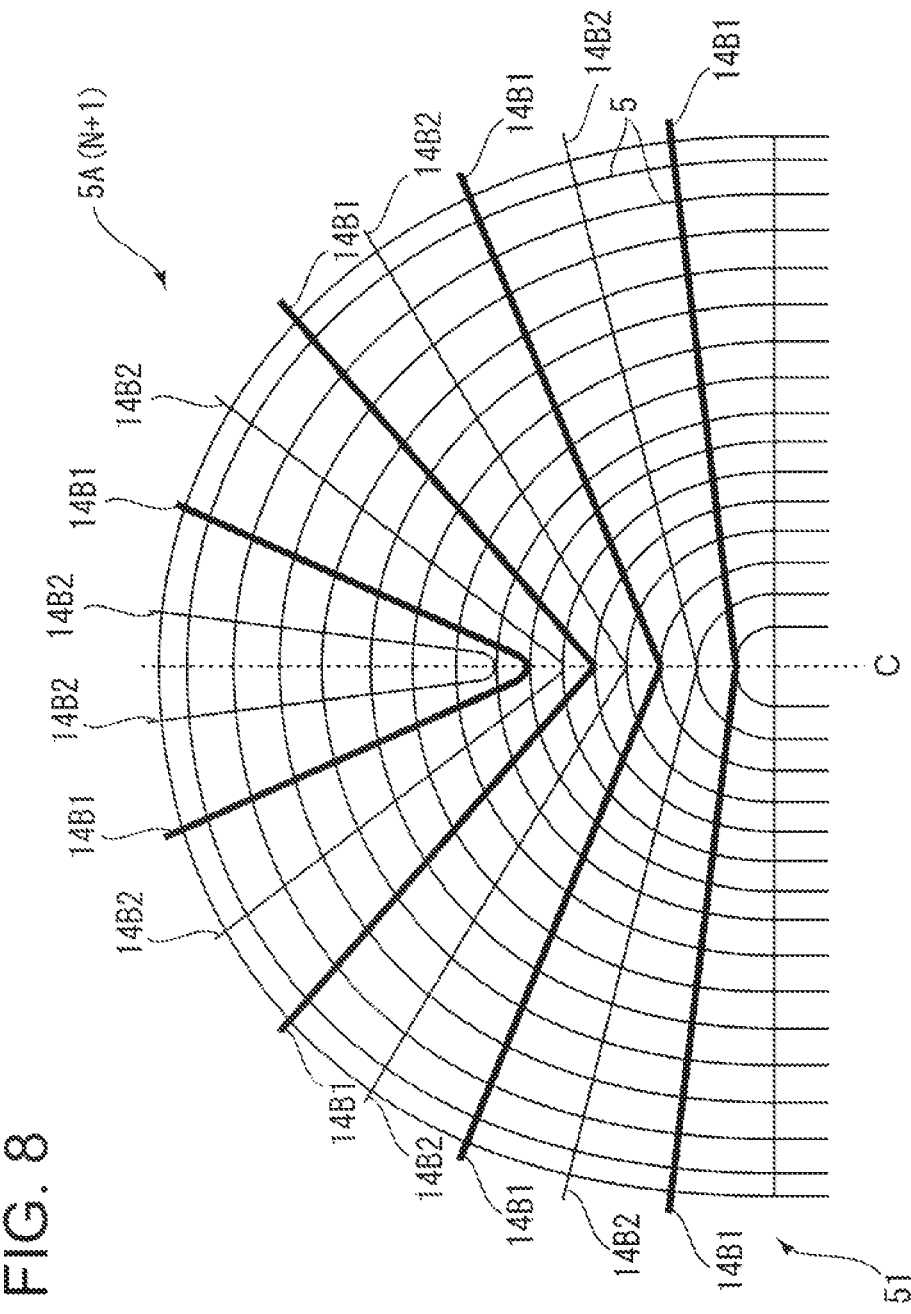
FIG. 8 is a diagram showing the layout of vibration damping members in a column 5A(N+1) of the heat-transfer tube bundle according to the second embodiment.
Figure 9:
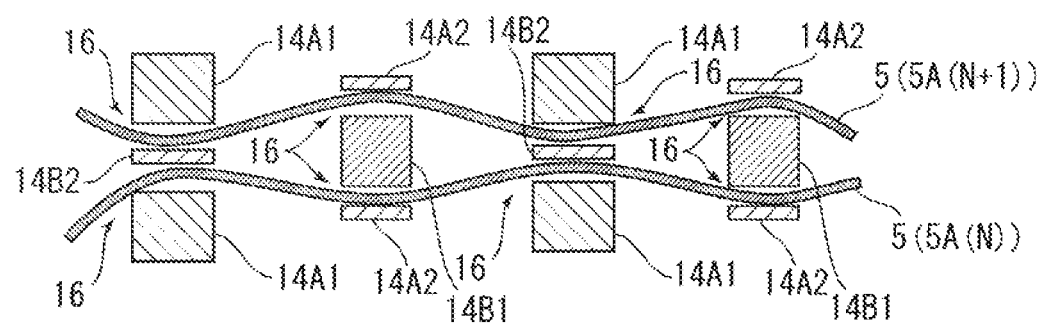
FIG. 9 is a plan view of the heat-transfer tube bundle and the vibration damping members shown in FIGS. 7 and 8.

Next, the vibration damping structure according to the second embodiment will be described. FIG. 7 is a diagram showing the layout of the vibration damping members 14 in a column 5A(N) of the heat-transfer tube bundle 51 according to the second embodiment. FIG. 8 is a diagram showing the layout of the vibration damping members 14 in a column 5A(N+1) of the heat-transfer tube bundle 51 according to the second embodiment. FIG. 9 is a plan view of the heat-transfer tube bundle 51 and the vibration damping members 14 shown in FIGS. 7 and 8.

In the present embodiment, the same features in the above embodiment are associated with the same reference numerals, and not described again unless otherwise required.

As shown in FIG. 7, a plurality of first vibration damping members 14A are disposed between the column 5A(N) and the column 5A(N+1). These first vibration damping members 14A are arranged so that a first thick vibration damping member 14A1 having large thickness and a first thin vibration damping member 14A2 having small thickness alternate. Meanwhile, as shown in FIG. 8, a plurality of second vibration damping members 14B are disposed between the column 5A(N+1) and the column 5A(N+2). These second vibration damping members 14B are arranged so that a second thick vibration damping member 14B1 having large thickness and a second thin vibration damping member 14B2 having small thickness alternate.

In other words, the first vibration damping member 14A includes the first thick vibration damping member 14A1 and the first thin vibration damping member 14A2 thinner than the first thick vibration damping member 14A1 which are alternately arranged along a common plane. Further, the second vibration damping member 14B includes the second thin vibration damping member 14B2 disposed so as to face the first thick vibration damping member 14A1 across the heat-transfer tube 5 and the second thick vibration damping member 14B1 disposed to face the first thin vibration damping member 14A2 across the heat-transfer tube 5.

The first vibration damping member 14A and the second vibration damping member 14B are disposed at the same position in the axial direction of the heat-transfer tube 5 so as to face each other across the heat-transfer tube 5. The pair of the first vibration damping member 14A and the second vibration damping member 14B, which face each other, have different thicknesses from each other in the array direction of the columns 5A. That is, the first thick vibration damping member 14A1 and the second thin vibration damping member 14B2 are disposed so as to be opposite across the heat-transfer tube 5 at the same position in the axial direction. Further, the first thin vibration damping member 14A2 and the second thick vibration damping member 14B1 are disposed so as to be opposite across the heat-transfer tube 5 at the same position in the axial direction. As a result, as shown in FIG. 9, each of the heat-transfer tubes 5 constituting the heat-transfer tube bundle 51 receives a contact force and is subjected to bending deformation (three-point bending) by these vibration damping members 14. The heat-transfer tube 5 subjected to bending deformation by the contact force has an uneven cross-section when viewed from above (in a plane intersecting the first vibration damping member 14A or the second vibration damping member 14B). The contact force based on such bending deformation is easy to intentionally adjust the magnitude, compared with a contact force mainly based on friction between members conventionally used, thus enabling setting of an appropriate contact force for suppressing vibration.

Moreover, even if local displacement occurs within the heat-transfer tube bundle 51 due to some factors, and the heat-transfer tube 5 or the vibration damping member 14 significantly vibrates with collision or sliding by a fluid force within the heat-transfer tube 5 and causes wear, it is possible to decrease a significant reduction in contact force by elasticity of the vibration damping member 14 and the heat-transfer tube 5 subjected to bending deformation. Thus, it is possible to avoid a state that vibration damping performance immediately disappears even when wear occurs.

Figure 10:
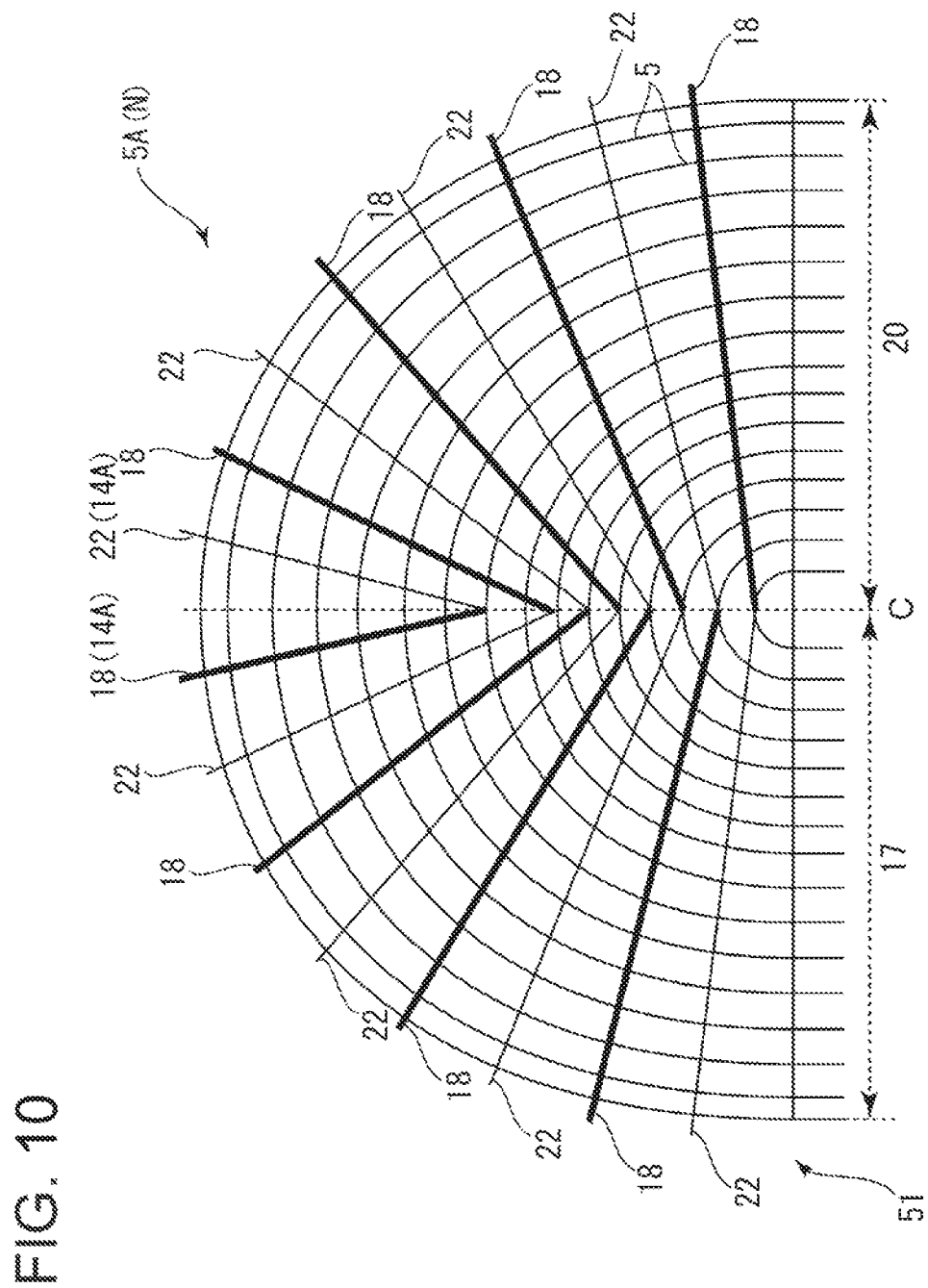
FIG. 10 is a diagram showing the layout of vibration damping members in a column 5A(N) of a heat-transfer tube bundle according to a modified example of the second embodiment.
Figure 11:
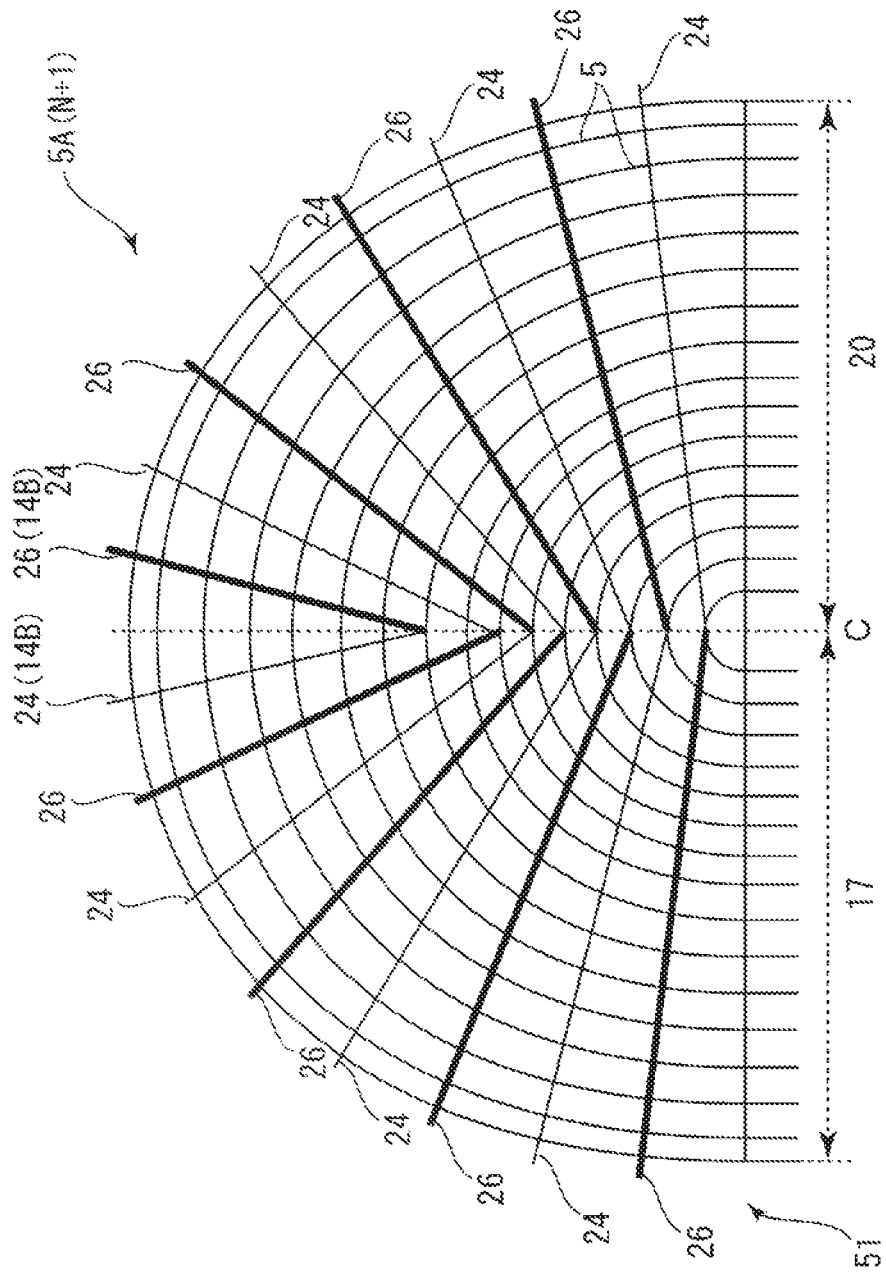
FIG. 11 is a diagram showing the layout of vibration damping members in a column 5A(N+1) of the heat-transfer tube bundle according to the modified example of the second embodiment.

FIG. 10 is a diagram showing the layout of the vibration damping members 14 in a column 5A(N) of the heat-transfer tube bundle 51 according to a modified example of the second embodiment. FIG. 11 is a diagram showing the layout of the vibration damping members 14 in a column 5A(N+1) of the heat-transfer tube bundle 51 according to the modified example of the second embodiment.

In this modified example, as shown in FIG. 10, each of the first vibration damping members 14A disposed between the columns 5A(N) and 5A(N+1) includes a first thick portion 18 disposed in a first which is a left half portion of the central plane C and a first thin portion 22 thinner than the first thick portion 18 and disposed in a second region 20 adjacent to the first region 17 along the axial direction of the heat-transfer tube 5. The first thick portion 18 is set so as to be thicker than the first thin portion. On the other hand, as shown in FIG. 11, each of the second vibration damping members 14B disposed between the columns 5A(N+1) and 5A(N+2) includes a second thin portion 24 disposed in the first region 17 and a second thick portion 26 disposed in the second region 20. The second thick portion 26 is set so as to be thicker than the second thin portion 24. In this way, the first thick portion 18 faces the second thin portion 24 across the heat-transfer tube 5, and the first thin portion 22 faces the second thick portion 26 across the heat-transfer tube 5.

Thus, in the first region 17 and the second region 20, the vibration damping members 14 having different thicknesses sandwich the heat-transfer tube 5 in an alternating manner with inverse patterns to apply contact forces. In the example of FIG. 3, the vibration damping members 14 having the same thickness are disposed on both sides of the central plane C at the outermost side. Accordingly, this region has a structure which is difficult to obtain a contact force based on bending deformation, unlike the other regions. By contract, in this modified example, bending deformation can be achieved even in a region near the central plane C without an additional member such as the third vibration damping member 14D in FIG. 6. Thus, it is possible to apply a contact force to the heat-transfer tube 5, and it is possible to exhibit excellent vibration damping performance.

As described above, the above embodiments provide the vibration damping member for a heat-transfer tube bundle capable of effectively suppressing a flow-induced vibration by appropriately adjusting a contact force applied from the vibration damping member to the heat-transfer tube.

INDUSTRIAL APPLICABILITY

At least one embodiment of the present invention can be applied to a vibration damping structure for a heat-transfer tube bundle including a plurality of heat-transfer tubes through which a fluid flows.

REFERENCE SIGNS LIST

1 Steam generator
2 Body section
3 Tube bundle wrapper
4 Tube sheet
5 Heat-transfer tube
5A Column
6 Tube support plate
7 Channel head
8 Partition plate
9 Moisture separator
10 Steam dryer
11 Feedwater ring
12 Steam outlet
13 Feedwater channel
14 Vibration damping member
15 Retention member
16 Concave portion
17 First region
20 Second region
51 Heat-transfer tube bundle

The invention claimed is:
1. A vibration damping structure for a heat-transfer tube bundle including
columns each composed of a plurality of heat-transfer tubes curved in a common plane and arranged in parallel to each other, the columns being arranged at an interval, the vibration damping structure comprising:

at least one first vibration damping member disposed between a Nth column and a N+1th column so as to intersect an array direction of the columns, where N represents a natural number; and at least one second vibration damping member disposed between the N+1th column and a N+2th column so as to intersect the array direction, wherein the first vibration damping member and the second vibration damping member are disposed at different positions in an axial direction of each heat-transfer tube, and thicknesses of the first vibration damping member and the second vibration damping member in the array direction are larger than an average value of a clearance between the columns under operation, wherein the plurality of the heat-transfer tubes are respectively arranged so that an arc portion is convex upward, and wherein the first vibration damping member and the second vibration damping member are alternately arranged along the array direction so that a bent portion which is curved in an opposite direction to the arc portion corresponds to the arc portion of the plurality of the heat-transfer tubes.

2. The vibration damping structure for the heat-transfer tube bundle according to claim 1,
wherein each heat-transfer tube has an uneven cross-section in a plane intersecting the first vibration damping member or the second vibration damping member, and wherein the first vibration damping member and the second vibration damping member abut on the heat-transfer tubes at a concave portion of the uneven cross-section.

3. The vibration damping structure for the heat-transfer tube bundle according to claim 1,
wherein the first vibration damping member and the second vibration damping member are curved in an opposite direction to the plurality of heat-transfer tubes, and the first vibration damping member and the second vibration damping member are formed so as to increase curvature with an increase in distance from a curvature center of the plurality of heat-transfer tubes.

4. The vibration damping structure for the heat-transfer tube bundle according to claim 1,
wherein the first vibration damping member and the second vibration damping member areeach composed of a plate member having a uniform thickness in the array direction.

5. The vibration damping structure for the heat-transfer tube bundle according to claim 1, further comprising a third vibration damping member disposed between the Nth column and the N+1th column so as to face the second vibration damping member across the heat-transfer tubes.

6. The vibration damping structure for the heat-transfer tube bundle according to claim 5, wherein the third vibration damping member is thinner in the array direction than the first vibration damping member.

7. A vibration damping structure for a heat-transfer tube bundle including columns each composed of a plurality of heat-transfer tubes curved in a common plane and arranged in parallel to each other, the columns being arranged at an interval, the vibration damping structure comprising:

at least one first vibration damping member disposed between a Nth column and a N+1th column so as to intersect an array direction of the columns, where N represents a natural number; and at least one second vibration damping member disposed between the N+1th column and a N+2th column so as to intersect the array direction, wherein the first vibration damping member and the second vibration damping member are disposed at an identical position in an axial direction of each heat-transfer tube so as to face each other across the heat-transfer tubes, and the first vibration damping member and the second vibration damping member have different thicknesses in the array direction, wherein the plurality of the heat-transfer tubes are respectively arranged so that an arc portion is convex upward, and wherein the first vibration damping member and the second vibration damping member are alternately arranged along the array direction so that a bent portion which is curved in an opposite direction to the arc portion corresponds to the arc portion of the plurality of the heat-transfer tubes.

8. The vibration damping structure for the heat-transfer tube bundle according to claim 7, wherein the at least one first vibration damping member includes a first thick vibration damping member and a first thin vibration damping member thinner than the first thick vibration damping member, the first thick vibration damping member and the first thin vibration damping member being alternately arranged along the common plane, and
wherein the at least one second vibration damping member includes a second thin vibration damping member disposed to face the first thick vibration damping member across the heat-transfer tubes and a second thick vibration damping member disposed to face the first thin vibration damping member across the heat-transfer tubes.

9. The vibration damping structure for the heat-transfer tube bundle according to claim 7, wherein each of the at least one first vibration damping member includes a first thick portion disposed in a first region and a first thin portion disposed in a second region adjacent to the first region along an axial direction of each heat-transfer tube, the first thin portion being thinner than the first thick portion, and
wherein each of the at least one second vibration damping member includes a second thin portion disposed to face the first thick portion across the heat-transfer tubes and a second thick portion disposed to face the first thin portion across the heat-transfer tubes.

10. The vibration damping structure for the heat-transfer tube bundle according to claim 7, wherein the first vibration damping member and the second vibration damping member are curved in an opposite direction to the plurality of heat-transfer tubes, and the first vibration damping member and the second vibration damping member are formed so as to increase curvature with an increase in distance from a curvature center of the plurality of heat-transfer tubes.

* * * * *